(12) United States Patent  
Strömberg et al.

(10) Patent No.: US 8,018,649 B2
(45) Date of Patent: Sep. 13, 2011

(54) IR CAMERA

(75) Inventors: Christoffer Strömberg, Stockholm (SE); Ove Gustafsson, Farsta (SE)

(73) Assignee: Flir Systems AB, Danderyd (SE)

( * ) Notice: Subject to any disclaimer, the term of this patent is extended or adjusted under 35 U.S.C. 154(b) by 300 days.

(21) Appl. No.: 12/017,386

(22) Filed: Jan. 22, 2008

(65) Prior Publication Data

US 2009/0185266 A1 Jul. 23, 2009

(51) Int. Cl.
*G02B 13/14* (2006.01)
(52) U.S. Cl. ......... 359/357; 359/350; 359/355; 359/356
(58) Field of Classification Search .................. 359/356, 359/355, 350, 557
See application file for complete search history.

(56) References Cited

U.S. PATENT DOCUMENTS 5,822,122 A * 10/1998 Kuno et al. .................... 359/557
2007/0039030 A1 * 2/2007 Romanowich et al. ....... 725/105
2008/0144156 A1 * 6/2008 Goodman et al. ............ 359/226

* cited by examiner

*Primary Examiner* — Joshua L Pritchett
(74) *Attorney, Agent, or Firm* — Haynes and Boone, LLP

(57) ABSTRACT

An IR camera comprising an optical system further comprises an additional optical element arranged in the form of a disk that is transparent to the infrared radiation in the beam path and at least a first motor arranged to tilt the additional optical element around a first axis substantially perpendicular to the beam path, and a control device for controlling said at least first motor in dependence of a first registered movement of the camera.

19 Claims, 2 Drawing Sheets

IR CAMERA

TECHNICAL FIELD

The present invention relates to image stabilization in an IR camera.

BACKGROUND AND RELATED ART

In practice, a hand-held camera will always shake a little. The movements will primarily be around a horizontal axis (yaw) and a vertical axis (azimuth or pitch). The magnitude of the movements will depend on the type of camera and other conditions, but will typically be in the order of ±0.15°.

The movements will normally have a frequency of up to 15 Hz. Movements in this frequency range can be compensated for by means of an image stabilization system. It is known to use one or more prisms or lenses to compensate for the movements and thereby stabilize the image.

U.S. Pat. No. 5,774,266 discloses an image stabilization system using a lens for deflecting the incoming radiation. The relative inclination between the optical axis of the photographic optical system and the optical axis 101a of the correcting lens 101 of the correcting optical mechanism which constitutes optical correcting means can be adjusted by causing an optical member to move in a plane perpendicular to or approximately perpendicular to the optical axis of an optical system, making the optical axis of the movable optical member eccentric with respect to the optical axis of the optical system. Adjustment means are provided to ensure that the optical axes are kept parallel.

WO 2007/091112 A1 discloses an image stabilizer comprising a prism. An optical image stabilizer is used to compensate for an unwanted movement of an imaging system, such as a camera. The camera has a folded optics system using a triangular prism to fold the optical axis. Two actuators are used to rotate the prism around two axes in order to compensate for the motion of the camera.

U.S. Pat. No. 6,370,329 discloses a camera in which two pivotable mirrors are used to deflect the incoming radiation in order to provide image stabilization. The mirrors are controlled in dependence of gyro signals.

For visible light cameras solutions are known in which the image detector itself is moved to compensate for the movement of the camera. This is not feasible for IR cameras since the sensor array in such cameras typically requires cooling.

OBJECT OF THE INVENTION

It is an object of the invention to provide an image stabilization device for an IR camera that is small and easy to operate.

SUMMARY OF THE INVENTION

This object is achieved according to the present invention by an IR camera comprising an optical system, said optical system comprising at least one focusing optical element for focusing incoming infrared radiation onto a sensor array of the camera, said incoming infrared radiation defining a beam path, said optical system further comprising an additional optical element arranged in the beam path and at least a first motor arranged to tilt the additional optical element around a first axis substantially perpendicular to the beam path, and a control device for controlling said at least first motor in dependence of a first registered movement of the camera, said camera being characterized in that the additional optical element is a disk that is transparent to the infrared radiation in the beam path. The disk that is used as an additional optical element is used to deflect the incoming radiation by displacing it linearly in relation to the optical axis. The disk is tilted in real time in response to detected camera movements, to compensate for the movements. The displacement depends on the tilt angle, the material used in the disk and the thickness of the disk.

The camera preferably comprises a second motor arranged to tilt the additional optical element around a second axis. The second axis is preferably, but not necessarily substantially perpendicular to the beam path and to the first axis. This will enable compensation for movement around both pitch and yaw axes. Perpendicular axes will facilitate the design of the system.

Preferably, a first position determining device is arranged associated with the first motor and arranged to determine the position of the first motor, and if there is a second motor, a second position determining device is arranged associated with the second motor and arranged to determine the position of the second motor. This enables feedback of each motor's actual position to the control device.

The additional optical element is arranged in the beam path of the incoming radiation, preferably between the optical system and the sensor array. Alternatively, if the optical system comprises at least two focusing optical elements for focusing the radiation, the additional optical element may be arranged between the at least two focusing optical elements. The additional optical element may also be placed in front of the optical system.

In a first preferred embodiment the IR camera further comprises at least a first angular rate sensor arranged to detect a first rotational movement around the first axis and feed information about the first rotational movement to the first position determining device. Preferably, in this embodiment the IR camera further comprises a second angular rate sensor arranged to detect a second rotational movement around the second axis and feed information about the second rotational movement to the second position determining device. The angular rate sensors may be any type of sensor that is capable of measuring a rotational movement, such as gyroscopes or accelerometers. The movement registered by means of these sensors is used to compute control signals that may be used to control the position of the motors.

According to a second preferred embodiment, the IR camera comprises an imaging part for generating visible light images and a processing means arranged to detect the first and/or second movement of the camera based on changes between a first and a second visible light image and feed information about said detected first and/or second movement to the first and, if present, second position determining device. The information about the movement obtained from the visible light images is used to compute the control signal that is used to control the motors.

Instead of using one additional disk that is tilted around two axes, the optical system may further comprise a second disk that is transparent to the infrared radiation in the beam path and a second motor arranged to tilt the second disk around a second axis substantially perpendicular to the beam path and to the first axis in dependence of a second registered movement of the camera. One disadvantage of this embodiment is that each disk will attenuate the radiation Preferably, the additional disk or disks comprise germanium or a germanium compound, such as Gasir®. Germanium has a relatively high refraction index, which makes it suitable because it will give a relatively high beam deflection in relation to the thickness of the disk and the tilt angle.

Another feasible material for the additional optical element is silicon or a silicon compound.

BRIEF DESCRIPTION OF THE DRAWINGS

The invention will be described in more detail in the following, by way of example and with reference to the appended drawings in which.

DETAILED DESCRIPTION OF EMBODIMENTS

Figure 1:
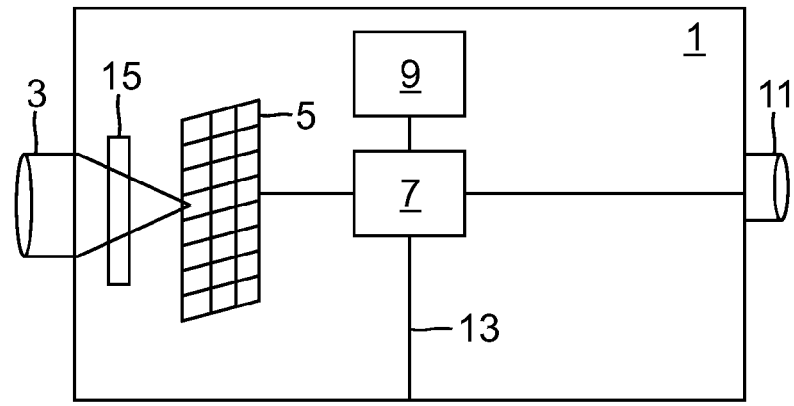
FIG. 1 illustrates schematically an IR camera having an image stabilization device according to the invention.

FIG. 1 is a schematic overview of an IR camera 1 according to an overall embodiment of the invention. As is common in the art, the IR camera 1 has an optical system 3 for focusing incoming infrared radiation onto a sensor array 5. The signals from the sensor array are processed in a processing device 7 to produce an IR image and possibly other data that may be displayed to a user of the camera, in ways that are common in the art. The camera may also comprise a memory unit 9 for storing the processed data, a display unit 11 for displaying the image and/or other data to the user, and/or one or more external connections 13 for communication with external devices (not shown), such as a computer.

The optical system 3 typically comprises one or more lenses and control devices for controlling the position of these lenses for focusing the incoming radiation onto the sensor array 5. To compensate for the movements of the camera, according to the invention, a plane disc 15 of a material that is transparent to IR radiation is placed in the optical path of the radiation. The disc 15 may be placed within the optical system, for example, between two lenses of the optical system, or between the optical system 3 and the sensor array 5. The disc 15 could also be placed in front of the optical system 3, although this would probably result in a less feasible construction of the camera.

The disc 15 is controlled by one or more control devices (not shown in FIG. 1) that are arranged to tilt the disc 15 around at least one axis. Preferably two control devices are used, to tilt the disc around a vertical axis and a horizontal axis, respectively, to compensate for the camera's rotational movement around these two axis. Any control device that will enable control of the disc 15 in real time based on the camera's movement may be used. Examples of such control devices will be discussed in connection with FIGS. 3 and 4.

Figure 2:
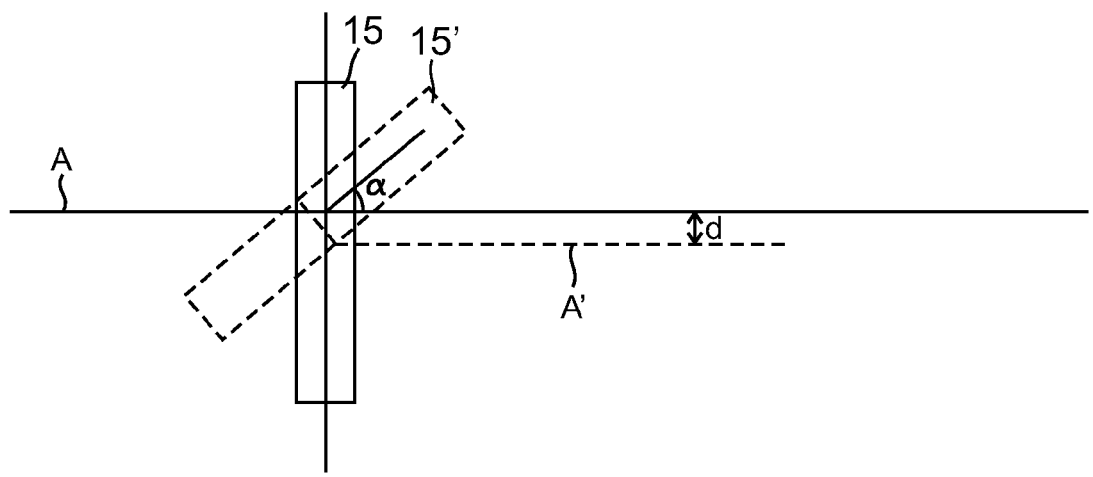
FIG. 2 illustrates schematically the function of a disc used according to the invention.

FIG. 2 illustrates the function of the disc 15 on the incoming radiation. The solid rectangle 15 illustrates the disc placed essentially perpendicular to the optical axis A of the optical system 3, as will typically be the case when the camera is not tilted. In this case the beam path will coincide with the direction of the optical axis. The dashed rectangle 15' shows the disc in a tilted position, where the tilt angle α has been exaggerated for illustration purposes. The dotted line A' shows the resulting beam path with the disc in the tilted position. As can be seen, the incoming radiation will be deflected by a distance d, depending on the tilt angle α. Hence, the inclination of the disc 15 can be varied in order to deflect the incoming radiation as much as is needed to compensate for the movement of the camera around an axis parallel to the tilt axis. As will be understood, by tilting the disc 15 around two different axes, movement of the camera around corresponding two axes can be compensated for, although this is not shown in FIG. 2.

The disc 15 is made from a material that is transparent to IR radiation. A preferred material is germanium, since it is permeable to IR radiation and has a high refraction index. Hence, the disc can be made relatively thin and still provide sufficient deflection. Germanium compounds may also be suitable, such as Gasir, which is a registered trademark of Umicore.

Another suitable material will be silicon, or silicon compounds that are transparent to infrared radiation.

The deflection provided is dependent on the refraction index of the disc, the thickness of the disc and the tilt angle. Hence, a suitable thickness of the disc will be dependent on the material used, and on the deflection needed, that is, the magnitude of the movements that must be compensated for. A thicker disc will provide increased deflection compared to a thinner disc of the same material. At the same time, since no material is completely transparent to radiation, a thicker disc will absorb more of the radiation, which may reduce the quality of the image. Therefore, the thickness of the disc will be a trade-off between the required deflection of the radiation, the maximum tilt angle of the disc in the arrangement and the desire to let through as much of the radiation as possible.

Figure 3:
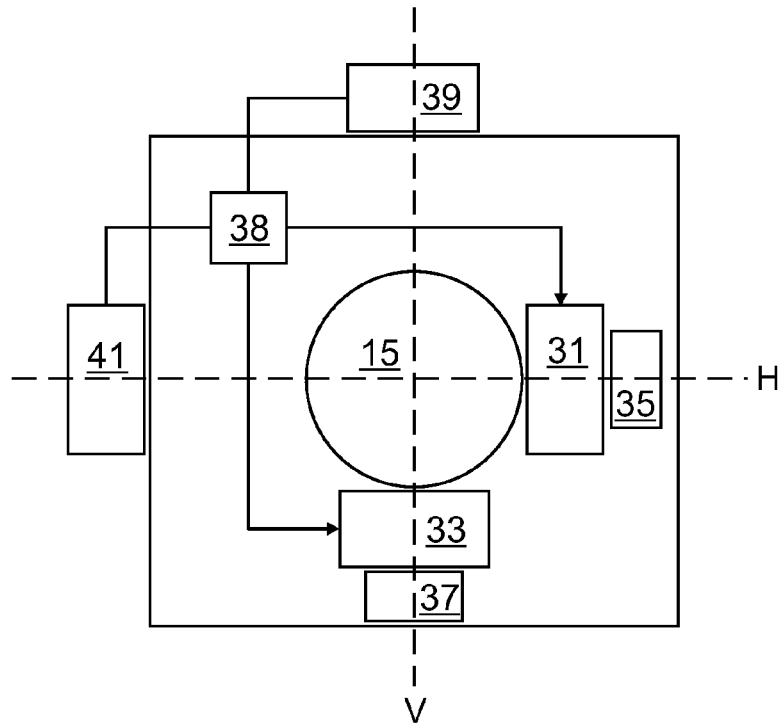
FIG. 3 illustrates schematically a control arrangement for the image stabilization device according to a first preferred embodiment.

FIG. 3 illustrates an arrangement including the disc 15 and control devices according to a first preferred embodiment of the invention. The arrangement of FIG. 3 may be arranged in the optical path as discussed in connection with FIG. 1. In the arrangement of FIG. 3, the disc 15 is controlled by a first motor 31 arranged to tilt the disc 15 around a horizontal axis H and a second motor 33 arranged to tilt the disc 15 around a vertical axis V. Each motor 31, 33 is connected to an encoder 35, 37, respectively, arranged to determine the position of the respective motor 31, 33. A control device 38 is arranged to control the positions of the motors. FIG. 3 shows one control device 38 for both motors 31, 33, but of course a separate control device may be used for each of the motors. The control device 38 receives information about the position of each motor 31, 33 from the respective encoder 35, 37.

A first and a second angular rate sensor 39, 41, are arranged to provide signals to the control device 38 representative of the rotation around the horizontal H and the vertical axis V, respectively. The control device 38 uses the rotation information from the angular rate sensors 39, 41 together with the information about the motors' positions received from the encoders 35, 37 to control the motors. The angular rate sensors 39, 41 may be accelerometers arranged to detect acceleration in a direction, or gyros arranged to measure the rotation around a specific axis. In this context gyros will be preferable, since they measure the actual rotation and therefore will give the same result independently of their position within the camera. An accelerometer measures a linear movement that must be translated into a rotational movement. Therefore, if one or more accelerometers are used, they should be placed as far as possible from the rotation axis. This may pose design restrictions, and may be difficult to implement in small cameras. The positioning would be particularly difficult if one multi-dimensional accelerometer or gyro were used to register movement around both axes. Such a gyro is available, for example, from Invensense.

Figure 4:
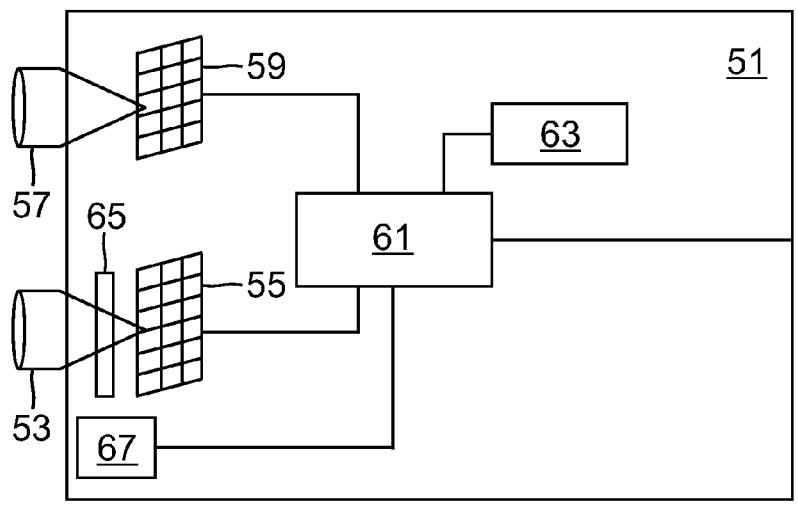
FIG. 4 illustrates schematically an IR camera having an alternative control arrangement for the image stabilization device.

FIG. 4 shows an overall block diagram of a camera 51 in which a second embodiment of the stabilization arrangement is implemented. The camera 51 comprises an IR imaging part in which an IR optical system 53 is arranged to focus incoming infrared radiation onto an IR sensor array 55. The camera also comprises a visible light imaging part in which a visible light optical system 57 is arranged to focus incoming visible light onto a visible light sensor array 59. A processing device 61 is arranged to receive image data from both sensor arrays 55, 59 and process said image data. The camera may be arranged to display the visible light images and the IR images separately and/or to blend the images in suitable ways, as is known in the art. The processed image data may be stored in a memory unit 63 presented to an operator and/or communicated to an external device (not shown).

As above, a disc 65 of an IR transparent material is arranged in the beam path of the IR optical system. A control arrangement 67, only shown schematically in FIG. 4, is arranged to tilt the disc 65 around at least a first axis. To this end, the control arrangement comprises at least a first motor (not shown) arranged in a similar way as in FIG. 3.

Of course, the control arrangement of FIG. 3, using a type of angular rate sensor could be applied in this kind of camera as well, but in the embodiment of FIG. 4 a different solution has been applied for determining the movement of the camera. In this embodiment the processing device 61 is arranged to process the visible light images to determine the displacement of a visible light image compared to a previous visible light image. This displacement can be used to obtain information regarding the movement of the camera. This information may in turn be used as input information to the control arrangement 67, in particular as control signals to the motors that control the tilting of the disc 65. An encoder (not shown) is used for each motor, to determine the position of the motor. The signals from the encoders are fed to the processing means 61, which uses the information about each motor's position to compute the control signal to the control arrangement 67.

Of course, instead of computing the control signals in the control device 61, the control arrangement 67 may comprise a processor arranged to receive information from the encoders and the processing device and compute the control signals to be fed to the motors.

The invention claimed is:

1. An optical system for use in an infrared (IR) camera, said optical system comprising:
    at least one focusing optical element for focusing incoming infrared radiation onto a sensor array of the camera, said incoming infrared radiation defining a beam path;
    an infrared optical element arranged within the infrared camera and is substantially transparent to the incoming infrared radiation and positioned in the beam path;
    a first motor arranged to tilt the infrared optical element around a first axis substantially perpendicular to the beam path;
    a control device for controlling said first motor based at least in part on a movement of the camera, wherein the infrared optical element displaces the incoming infrared radiation beam path to a second beam path that is substantially parallel to the incoming infrared radiation beam path in response to the movement of the camera, wherein the infrared optical element comprises two substantially planar surfaces that extend substantially perpendicular to the incoming infrared radiation.

2. An optical system according to claim 1, further comprising a second motor arranged to tilt the infrared optical element around a second axis substantially perpendicular to the beam path and the first axis.

3. An optical system according to claim 2, further comprising a first position determining device associated with the first motor and arranged to determine the position of the first motor, a second position determining device associated with the second motor and arranged to determine the position of the second motor, wherein the control device controls the second motor based at least in part on the movement of the camera and the position of the second motor determined by the second position determining device.

4. An optical system according to claim 3, further comprising a first angular rate sensor arranged to detect a first rotational movement around the first axis, the first angular rate sensor further arranged to feed information about the first rotational movement to the control device, wherein the movement comprises the first rotational movement.

5. An optical system according to claim 4, further comprising a second angular rate sensor arranged to detect a second rotational movement around the second axis, the second angular rate sensor further arranged to feed information about the second rotational movement to the control device, wherein the movement further comprises the second rotational movement.

6. An optical system according to claim 3, further comprising:
    an imaging part for generating visible light images; and
    a processor arranged to detect the movement of the camera based at least in part on changes between a first and a second visible light image generated by the imaging part, wherein the processor is further arranged to feed information about said detected movement to the control device.

7. An optical system according to claim 1, wherein the infrared optical element is positioned between the optical system and the sensor array.

8. An optical system according to claim 1, wherein the at least one focusing optical element comprises at least two focusing optical elements for focusing the radiation, wherein the infrared optical element is positioned between the at least two focusing optical elements.

9. An optical system according to claim 1, wherein the infrared optical element comprises germanium or a germanium compound.

10. An optical system according to claim 1, wherein the infrared optical element comprises silicon or a silicon compound.

11. An IR camera comprising the optical system of claim 1.

12. The optical system of claim 1, wherein the infrared optical element comprises a first disk.

13. An optical system according to claim 12, wherein the optical system further comprises:
    a second disk that is substantially transparent to the incoming infrared radiation; and
    a second motor arranged to tilt the second disk around a second axis substantially perpendicular to the beam path and to the first axis based at least in part on the movement of the camera.

14. A method for adjusting an infrared optical element inside an IR camera, the method comprising:
    receiving incoming infrared radiation along a first beam path;
    receiving, from a first position determining device, data representing a position of a first motor, wherein the first motor is arranged to tilt the infrared optical element around a first axis, wherein the infrared optical element comprises two substantially planar surfaces that extend substantially perpendicular to the incoming infrared radiation;
    receiving data representing a movement of the camera;
    generating a control signal for controlling the first motor, wherein the control signal is generated based at least in part on the data representing the movement of the camera and a position of the first motor, and tilting the infrared optical element to displace the first beam path to a second beam path substantially parallel to the first beam path in response to the movement of the camera.

15. The method of claim 14, wherein the data representing the movement of the camera is received from an angular rate sensor.

16. The method of claim 14, wherein the data representing the movement of the camera is generated based at least in part on changes between a first and a second visible light image.

17. The method of claim 14, wherein the infrared optical element comprises a disk.

18. An optical system for use in an infrared (IR) camera, said optical system comprising:
- at least one focusing optical element for focusing incoming infrared radiation onto a sensor array of the camera, said incoming infrared radiation defining a beam path;
- an infrared optical element that is substantially transparent to the incoming infrared radiation and positioned in the beam path, wherein the infrared optical element comprises two substantially planar surfaces that extend substantially perpendicular to the incoming infrared radiation;
- a first motor arranged to tilt the infrared optical element around a first axis substantially perpendicular to the beam path;
- a control device for controlling said first motor based at least in part on a movement of the camera, wherein the control device comprises an imaging part for generating visible light images and a processor arranged to detect the movement of the camera based at least in part on changes between a first and a second visible light image generated by the imaging part, wherein the processor feeds information about said detected movement to the control device wherein the infrared optical element displaces the incoming infrared radiation beam path to a second beam path that is substantially parallel to the incoming infrared radiation beam path in response to the movement of the camera.

19. The optical system of claim 18, wherein the infrared optical element comprises a disk.

* * * * *